United States Patent
Pichot

(10) Patent No.: US 9,035,823 B2
(45) Date of Patent: May 19, 2015

(54) METHOD FOR MONITORING THE STATE OF A FILL LEVEL MEASURING DEVICE OPERATING ACCORDING TO THE RADAR PRINCIPLE

(71) Applicant: Krohne S.A., Romans-Cedex (FR)

(72) Inventor: Vincent Pichot, Romans sur IscereF (FR)

(73) Assignee: Krohne S.A., Romas-Cedex (FR)

( * ) Notice: Subject to any disclaimer, the term of this patent is extended or adjusted under 35 U.S.C. 154(b) by 267 days.

(21) Appl. No.: 13/674,398

(22) Filed: Nov. 12, 2012

(65) Prior Publication Data
US 2014/0022112 A1    Jan. 23, 2014

(30) Foreign Application Priority Data
Jul. 19, 2012   (DE) .......................... 10 2012 014 267

(51) Int. Cl.
| | |
|---|---|
| *G01S 13/08* | (2006.01) |
| *G01F 23/00* | (2006.01) |
| *G01F 23/284* | (2006.01) |
| *G01S 7/40* | (2006.01) |

(52) U.S. Cl.
CPC ............ *G01S 13/08* (2013.01); *G01F 23/0076* (2013.01); *G01F 23/284* (2013.01); *G01S 7/40* (2013.01)

(58) Field of Classification Search
CPC ........ G01F 23/0076; G01S 13/08; G01S 7/40
USPC .................................................. 342/124, 173
See application file for complete search history.

(56) References Cited

U.S. PATENT DOCUMENTS

| | | | |
|---|---|---|---|
| 6,642,807 B1 | 11/2003 | Gard | |
| 6,891,513 B2 | 5/2005 | Kienzle et al. | |
| 7,095,365 B2 | 8/2006 | Klöfer et al. | |
| 7,143,636 B2 | 12/2006 | Schmitteckert | |
| 7,827,866 B2 | 11/2010 | Galinsky | |
| 7,855,676 B2 * | 12/2010 | Ohlsson et al. | ............... 342/124 |
| 7,965,087 B2 | 6/2011 | Reimelt et al. | |
| 2005/0052314 A1 * | 3/2005 | Spanke et al. | ................ 342/124 |
| 2008/0303710 A1 * | 12/2008 | Kienzle et al. | ................ 342/124 |

FOREIGN PATENT DOCUMENTS

DE            44 07 823 A1    9/1995

* cited by examiner

*Primary Examiner* — Timothy A Brainard
(74) *Attorney, Agent, or Firm* — Roberts Mlotkowski Safran & Cole, P.C.; David S. Safran

(57) ABSTRACT

A method for monitoring the state of a fill level measuring device (1) operating according to the radar principle and such a fill level measuring device, wherein the fill level measuring device (1) has at least one transceiver unit (2) for transmitting and receiving electromagnetic signals, and at least one antenna (3) for guiding, radiating and receiving electromagnetic signals. The antenna (3) has at least one interior space (4), and wherein the antenna (3) has a transmission characteristic with regard to the transmission of electromagnetic signals. Electromagnetic signals are emitted or directed at least partially in the direction of a wall section (5) of the interior space (4) of the antenna (3), the received electromagnetic signals are evaluated with respect to the transmission characteristic of the antenna (3), and the result of the evaluation is compared to at least one stored reference value.

4 Claims, 2 Drawing Sheets

METHOD FOR MONITORING THE STATE OF A FILL LEVEL MEASURING DEVICE OPERATING ACCORDING TO THE RADAR PRINCIPLE

BACKGROUND OF THE INVENTION

1. Field of the Invention

The invention relates to a method for monitoring the state of a fill level measuring device operating according to the radar principle, wherein the fill level measuring device comprises at least one transceiver unit for transmitting and receiving electromagnetic signals, wherein the fill level measuring device has at least one antenna for guiding, radiating and receiving electromagnetic signals, wherein the antenna has at least one interior space, and wherein the antenna is characterized by a transmission characteristic with regard to the transmission of electromagnetic signals. Furthermore, the invention relates to a fill level measuring device operating according to the radar principle, having at least one transceiver unit for transmitting and receiving electromagnetic signals and at least one antenna for guiding, radiating and receiving electromagnetic signals, wherein the antenna has at least one interior space, and the antenna is characterized by a transmission characteristic with regard to the transmission of electromagnetic signals.

2. Description of Related Art

In industrial measurement technology, radar fill level measuring devices are frequently used to determine the fill level of media, such as liquids, bulk solids or slurries inside containers such as tanks or silos. The transit time method used by the measuring device is based on the physical law that the transit distance, for example, of an electromagnetic signal is equal to the product of the transit time and the propagation speed. In the case of measuring the fill level of a medium—for example, a liquid or a bulk solid—in a container, the transit distance corresponds to twice the distance between an antenna radiating an electromagnetic signal and then receiving it again and the surface of the medium. The wanted echo signal—i.e., the signal reflected at the surface of the medium—and its transit time are determined by the so-called echo function or, respectively, the digitized envelope curve. The envelope curve represents the amplitudes of the echo signals as a function of the distance "antenna—surface of the medium." The fill level can be calculated from the difference between the known distance of the antenna to the floor of the container and the distance between the surface of the medium and the antenna as determined by measurement. The transmitted and received electromagnetic signals are mostly microwave radiation.

Frequently, dielectric resonators are used as antennas. Such dielectric antennas have a resonance behavior similar to waveguides, however, since they do not have metal walls, they can radiate electromagnetic energy and thus act as antennas. A large number of construction forms are already known from different areas of technology, in each of which a dielectric material, such as a ceramic, is used for guiding and radiating the electromagnetic waves. Mostly, low-loss materials having low permittivity (another name for permittivity is dielectric conductivity) are used. TEFLON® (polytetrafluoroethylene) or polypropylene is used, for example. Another variation is that the microwave signals are guided along a rope or a rod.

Measuring devices are usually sealed against the process or the medium whose fill level is to be measured. Depending on the application, an additional encapsulation of the measuring device may be required opposed to a remote control body or opposed to an electronics unit removed from the process. A second sealing or encapsulation is particularly important; when, for example, the media is aggressive, harmful or explosive or when high pressures and high temperatures prevail in the process. Horn antennas for fill level measuring devices operating according to the radar principle, which are provided with protection and thus close the opening of the antenna, can be found, for example, in the U.S. Patent Application Publication 2003/0151560 A1 and corresponding U.S. Pat. No. 6,891,513 B2. A known method for testing if the seal facing the medium is sealed, is to provide an opening, such as a hole in the housing, between the two seals through which the medium or a gas mixture in the container escapes from the housing through a leakage and, thus, is an obvious signal. Such a procedure is questionable for dangerous and/or polluting substances or unacceptable in hygienic applications in the food and pharmaceutical industries. Other monitoring possibilities can be found in German Patent Application DE 103 52 471 A1 and corresponding U.S. Pat. No. 7,143,636 B2 or German Patent Application DE 10 2007 052 395 A1 and corresponding U.S. Pat. No. 7,827,866 B2.

For level measuring devices operating according to the radar principle, the patent U.S. Pat. No. 7,855,676 B2 describes a monitoring method in which a movable body is arranged in a hollow waveguide between a sealed horn antenna and an electronic unit. If the medium should enter into the waveguide through a leak, the body would then shift and thus change the transmission characteristic of the waveguide. However, this configuration is complex.

SUMMARY OF THE INVENTION

The primary object of the present invention is, thus, to provide a method for monitoring a fill level measuring device operating according to the radar principle, or a fill level measuring device that allows this method, wherein the monitoring of the seal facing the medium is simpler than in the prior art.

The indicated object is initially and essentially met according to the invention with the method described herein in that the electromagnetic signals are emitted or directed at least partially in the direction of a wall section of the interior space of the antenna, that the received electromagnetic signals are evaluated with respect to the transmission characteristic of the antenna, and that the result of the evaluation is compared to at least one stored reference value. This interior space is, in particular, the interior space within the antenna of the fill level measuring device between the first seal facing the medium and the second seal, which, for example, faces the surroundings, electronic components, or a remote control station. If the medium penetrates into the interior space, in particular as the result of a leak of the first seal, the transmission characteristic of the antenna changes as a result of an appropriate matching between the medium, a medium within the interior space and the nature of the wall section. The latter is, in particular, determined by the fact that the electromagnetic signals are emitted or guided or directed toward the specified wall section as an excitation signal. In one design, the radiating or guiding direction is continuously directed toward the wall section, i.e., the wall section is located in the direction, in which the electromagnetic signals are also transmitted or guided also for the normal fill level measurements.

In an alternative design, the signals are only temporarily guided or emitted in the direction of the wall section for the monitoring of the seal. In a further design, the wall section is part of the first seal in the direction of the process medium. For example, that a particular characteristic in the received electromagnetic signals results due to the wall section and that this characteristic is missing or changed significantly when the seal is damaged is taken advantage of in this design. The change of the characteristic can, in one variation, be due to the wall section itself being damaged and/or changed in its position or orientation.

In another variation, modifications result in that foreign medium from the process enters into the interior space or in that the medium, which is located in the interior space, escapes due to a leak in the seal. In a further design, the interior space is filled with, in particular, dry air as a medium. In an alternative design, the interior space is evacuated. The invention as a whole is characterized by a simple, and therefore, inexpensive construction. In one design, at least one comparison value is saved for monitoring during an initialization measurement.

Furthermore, the indicated object is achieved in a further teaching of the invention by a fill level measurement device operating according to the radar principle as mentioned above, characterized in at least one wall section of the interior space at least partially comprises a ceramic—having, in particular, a low permittivity. The fill level measuring device is particularly suitable for the implementation of the previously described inventive method. Alternatively, however, other methods may also be applied, or it is even possible that a second seal is omitted entirely. A ceramic has the advantage that it can be exposed to many different, for example, corrosive media and process conditions such as e.g., high temperatures. The wall section is in particular at least partially designed such that it is, at least partially, electrically conductive. In one design, at least one electrical conductor, e.g., of metal, is arranged in the wall section.

In one design, the wall section at least partially comprises a composite material, and in an advantageous design, in particular, at least partially of a ceramic material embedded in a metallic matrix. In the latter composite, the material is a cermet, which is characterized in particular by a high hardness and wear resistance. In general, cermets are known as non-conductors. The ceramic components, for example, are aluminum oxide or zirconium dioxide, wherein the metal component is possibly niobium, molybdenum, titanium, cobalt, zirconium or chromium.

A particularly advantageous design is that the wall section opposite a second seal is arranged such that at least one electric conductor is passed through the interior space, and that the interior space has an electrically conductive wall around—in particular coaxial—the electrical conductors. The interior space is evacuated, in one design, and filled with dry air in an alternative version. In general, the interior space is filled with a medium that acts as a dielectric in the design. In an additional design, the second seal is configured essentially like the wall section, i.e., in particular comprises a ceramic. The electrically conductive wall, for example, is formed by a metallic wall or a wall coated with metal. If, in the case of error, the interior space is no longer sealed, i.e. if another medium enters into the interior space or the medium escapes from the interior, then the dielectric constant changes, which leads to the electromagnetic waves—compared to the error-free state with an undamaged seal—spreading at a different velocity or which leads to the transmission characteristic of the antenna changing as a whole. Normally, the dielectric conductivity of the medium in the interior space is essentially equal to one, such that the propagation velocity slows down with the square root of the dielectric conductivity of the medium or medium mixture that result in the interior space in the case of a damaged seal. Here, the interior of the antenna is used in this embodiment, in particular for the transmission of electromagnetic signals. This design can also be described in such a way that a space is found behind the first seal, and thus behind the wall section made of ceramics (in an alternative design, the wall section is made of a material different from a ceramic), the electromagnetic waves being spread in the space, which is closed with a second seal. Since the interior space acts as a dielectric and since the interior space is in contact with the process chamber via a defective seal in the region of the wall portion, and thereby the relative permittivity of the dielectric changes, damage to the seal leads to a different transmission characteristic, which can be used as an indicator of the state of the seal.

In one design, the wall section is flat on two sides. These are, in particular, the sides opposite one another that face the medium or the interior space.

In one design, the wall section is surrounded by a metal layer or a metal ring. If the wall section is connected, for example, with titanium, then the wall portion as a whole, for example, can also be welded with stainless steel. By contacting the wall portion with a flange or with a part of a container or a tube, etc., the interior space of the antenna can be formed partly by these additional elements. In the aforementioned design, a metal layer also allows electrical contact with the electrically conductive wall, which at least partially also comprises a metal in one design. In one design, an electrical conductor for guiding electromagnetic signals is passed through the wall section and, for example, attached by metallic pins.

In an advantageous design, an appropriately configured control unit is provided for carrying out the method described above for monitoring the state. In one variation, the control unit for evaluation of the received electromagnetic signals is configured with respect to the transmission characteristic of the antenna. Moreover, at least one storage unit is provided in a further design for storing at least one comparison value. The comparison value is preferably determined during the above initialization in one variation.

In detail, there are a number of possibilities for designing and further developing the antenna according to the invention and the fill level measuring device according to the invention as will be apparent from the following description of embodiments in conjunction with the accompanying drawings.

DETAILED DESCRIPTION OF THE INVENTION

Figure 1:
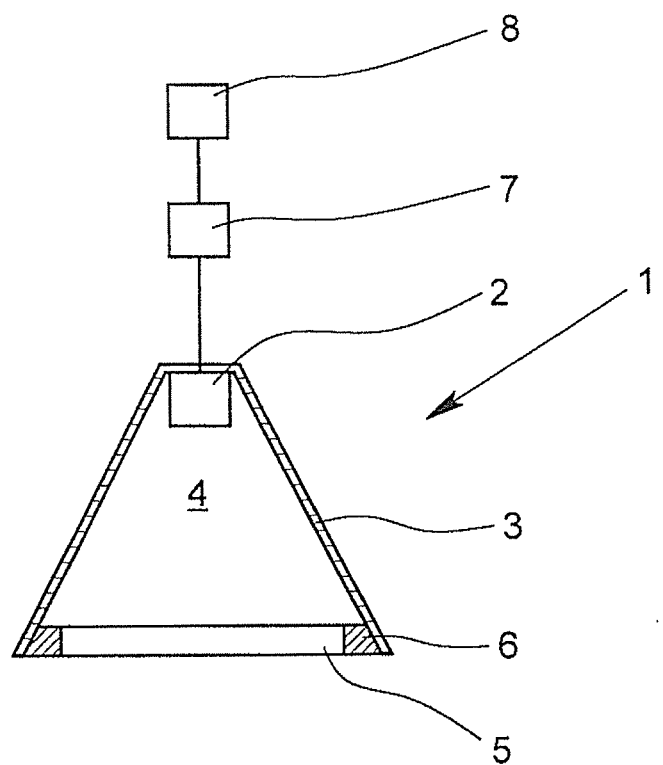
FIG. 1 is a schematic sectional view showing essentially the functional correlation of a fill level measuring device as a block circuit according to a first variation and FIG. 2 is a schematic sectional view showing essentially the functional correlation of a fill level measuring device according to a second variation, including a purely schematically shown signal pattern for two different cases.

FIG. 1 shows a fill level measuring device 1 according to the invention. Electromagnetic signals are generated by the transceiver unit 2, and in particular, received again after reflection on the surface of the—not shown here—medium, whose fill level is to be determined. These are, in particular, microwave signals. An antenna 3 is used for guiding, emitting and receiving the signals, the antenna 3 being designed as a horn antenna in the illustrated embodiment and having an interior space 4 in its recess, which is limited in the direction of the medium—not shown here—by a wall section 5. The wall section 5 is comprised, in particular, of a so-called cermet, i.e., a composite material of a ceramic and a metal. The (here) circular wall section 5 is surrounded by a metal ring 6, which is used to connect to the antenna 3. The interior space 4, which is limited on one side by the transceiver unit 2, is filled with air in the embodiment shown.

The control unit 7 is used to control the transceiver unit 2 and evaluates, for example, the received signals with respect to the transmission characteristic of the antenna 3. Access to the memory unit 8 may also take place for this, in which at least one comparison value is stored for the evaluation of the transfer characteristic. If a liquid, a gas, dust or the like from the process penetrates into the inner space 4, then the transmission characteristics of the antenna 3 changes, which is obvious and identifiable in the evaluation.

Figure 2:
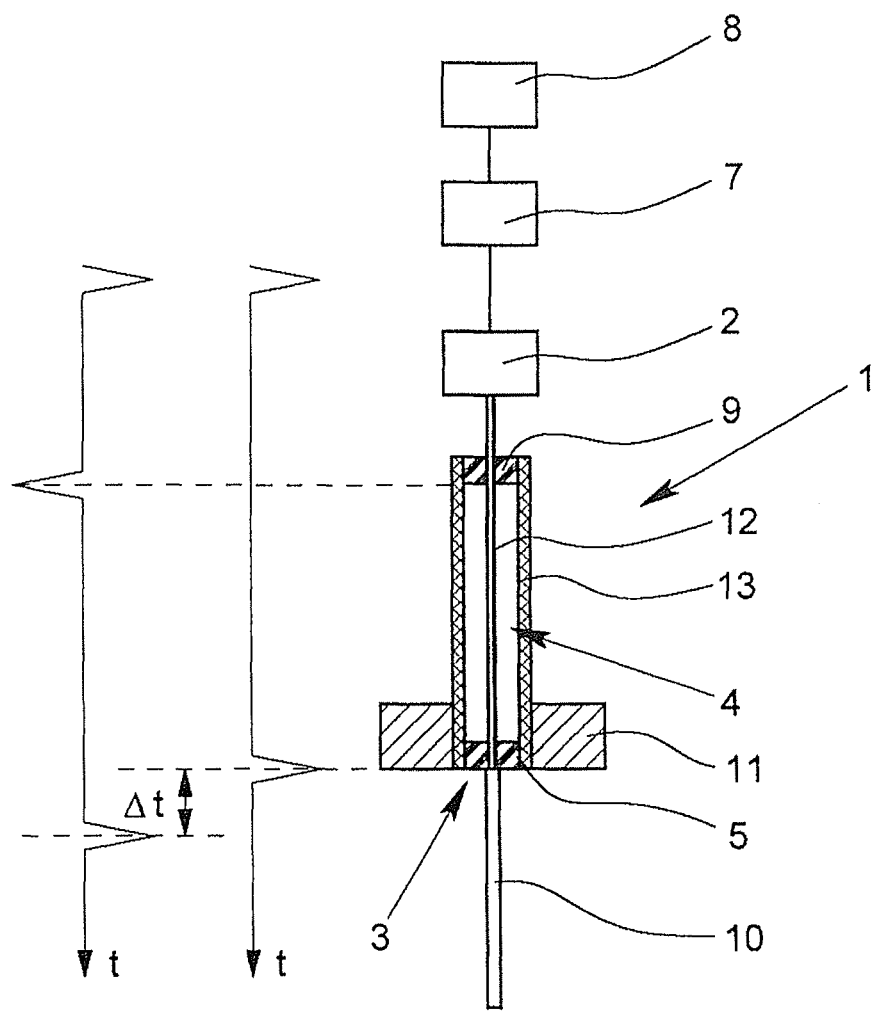

A different type of antenna 3 is shown in FIG. 2. This is a fill level measuring device 1 with a microwave signal guided on a probe 10. In this variation, the signal is not propagated free in space, e.g., in the container in which the medium is located, but it is led along the probe 10. The interior space 4 of the antenna 3, which is used here, in particular, for guiding the electromagnetic signals, lies, in the variation shown, behind the process end, which is formed by the wall portion 5 in the flange 11. In this inner space 4, the electromagnetic signals are guided, starting from the transceiver unit 2, via the electrical conductor 12, which is fixed with two pins in the wall section 5 made of a cermet, in one variation.

In the illustrated second variation, the wall section 5 of cermet is located opposite a second seal 9, which, in the illustrated embodiment, is also made of a cermet. The interior space 4 is surrounded on the side, and thus, coaxially by an electrically conductive wall 13, which, for example, is formed by a metal. The electromagnetic waves can propagate in this special interior space 4, which is filled, in the shown example, with dry air, so that the dielectric of the inner space 4, in the normal case, has a relative permittivity of 1. The control unit 7 and the memory unit 8 are configured as shown in the variation in FIG. 1 and perform the same tasks.

To the left of the arrangement in FIG. 2, two signal patterns as a function of time t are shown schematically. The inner pattern is obtained if the first seal, which is provided by the wall portion 5, is alright, i.e. not damaged. The upper signal is the excitation signal as zero mark. The next signal, at the level of the end of the wall section 5, results from the transition of the electromagnetic wave from the interior space 4 into the process chamber, into which the probe 10 extends. The impedance of the wall portion 5 and the second seal 9 is equal—at least in consideration—to the impedance of the dielectric in the interior space. If the seal is broken, for example, the medium to be monitored escapes from the process chamber into the interior space 4. This changes the relative permittivity in the inner space 4, which leads, in particular to a—here, reduced—propagation speed of electromagnetic signals in the interior space 4. The change results in dependence of the square root of the relative permittivity of the dielectric, which fills the interior space 4 after the seal is broken. Slowing the propagation of electromagnetic signals can therefore be recognized in the outer pattern by the fact that the signal appears later in the transition from interior space to process chamber than in a state with a functioning seal. Further, yet another additional signal results during the transition between the second seal 9 and the interior space 4. The signal pattern has thus changed significantly due to the leakage and the transmission characteristics of the antenna 3 have become different. If this pattern of outer pattern is compared with the stored pattern of the inner course, it is obvious that something must have happened that can cause such a change, and this must be a leak. Therefore, it can be inferred from the change in the transmission characteristics, that the seal has been broken.

What is claimed is:

1. Fill level measuring device operating according the radar principle, comprising:
    at least one transceiver unit for transmitting and receiving electromagnetic signals,
    at least one antenna for guiding, radiating and receiving electromagnetic signals, and
    at least one probe for guiding said electromagnetic signals,
    said antenna having at least one interior space and having a transmission characteristic with regard to the transmission of electromagnetic signals,
    wherein at least one wall section of said at least one interior space is made at least partially of a ceramic having a low permittivity,
    said at least one wall section being arranged opposite to a seal through which at least one electrical conductor extends into said at least one interior space, said electrical conductor being electrically connected with said probe, and
    wherein said interior space having an electrically conductive wall extending around said electrical conductor,
    said seal being located between said electrically conductive wall and said at least one electrical conductor.

2. Fill level measuring device according to claim 1, wherein said at least one wall section is made at least partly of a composite material, and said composite material at least partially comprising a ceramic material bound in a metallic matrix.

3. Fill level measuring device according to claim 1, wherein the at least one wall section is surrounded by a metal layer or a metal ring.

4. Fill level measuring device according to claim 1 wherein at least one control unit is provided which is adapted for evaluating electromagnetic signals received by said at least one transceiver unit with respect to a transmission characteristic of the antenna and for comparing the result of the evaluation to at least one stored reference value, further comprising at least one memory unit for storing said at least one reference value.

* * * * *